Figure 1:
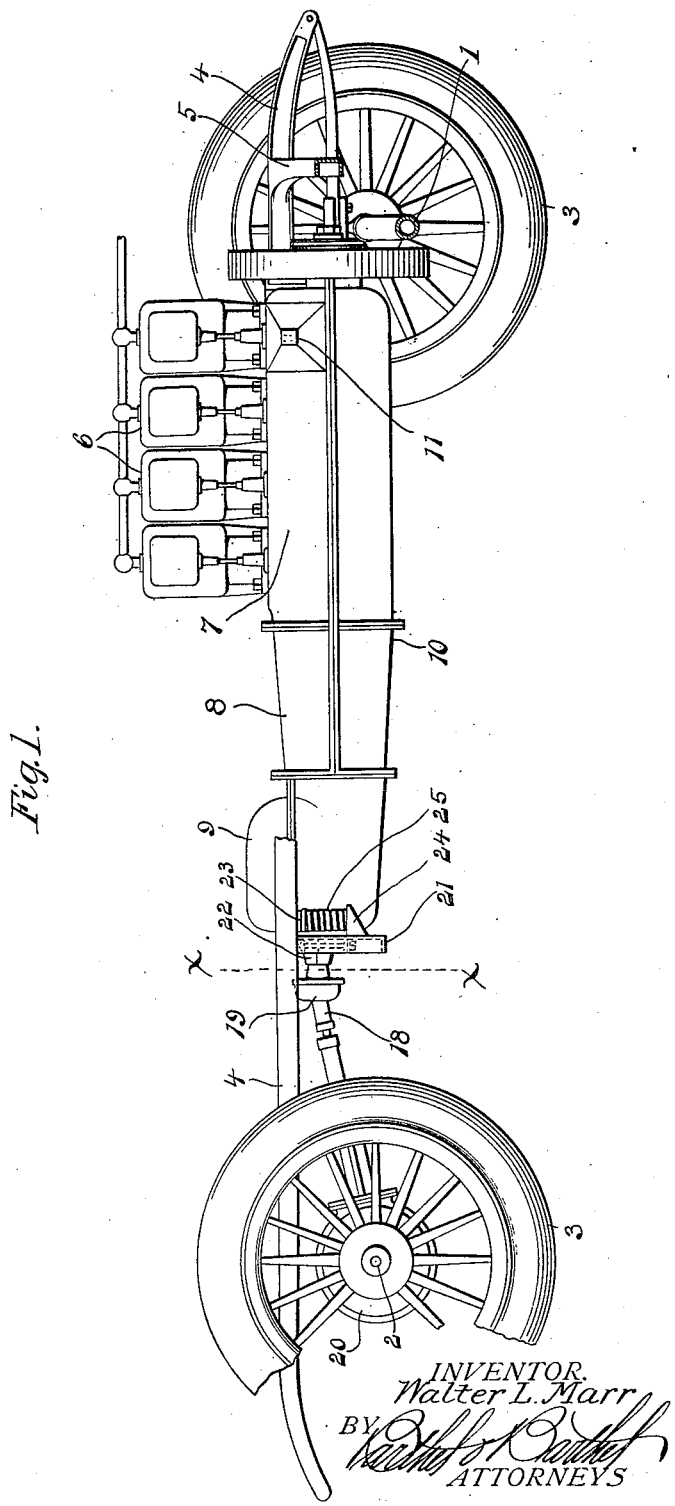

No. 886,528.

PATENTED MAY 5, 1908.

W. L. MARR.
MOTOR VEHICLE.
APPLICATION FILED JULY 9, 1906.

3 SHEETS—SHEET 1.

WITNESSES:

INVENTOR.
Walter L. Marr
BY
ATTORNEYS

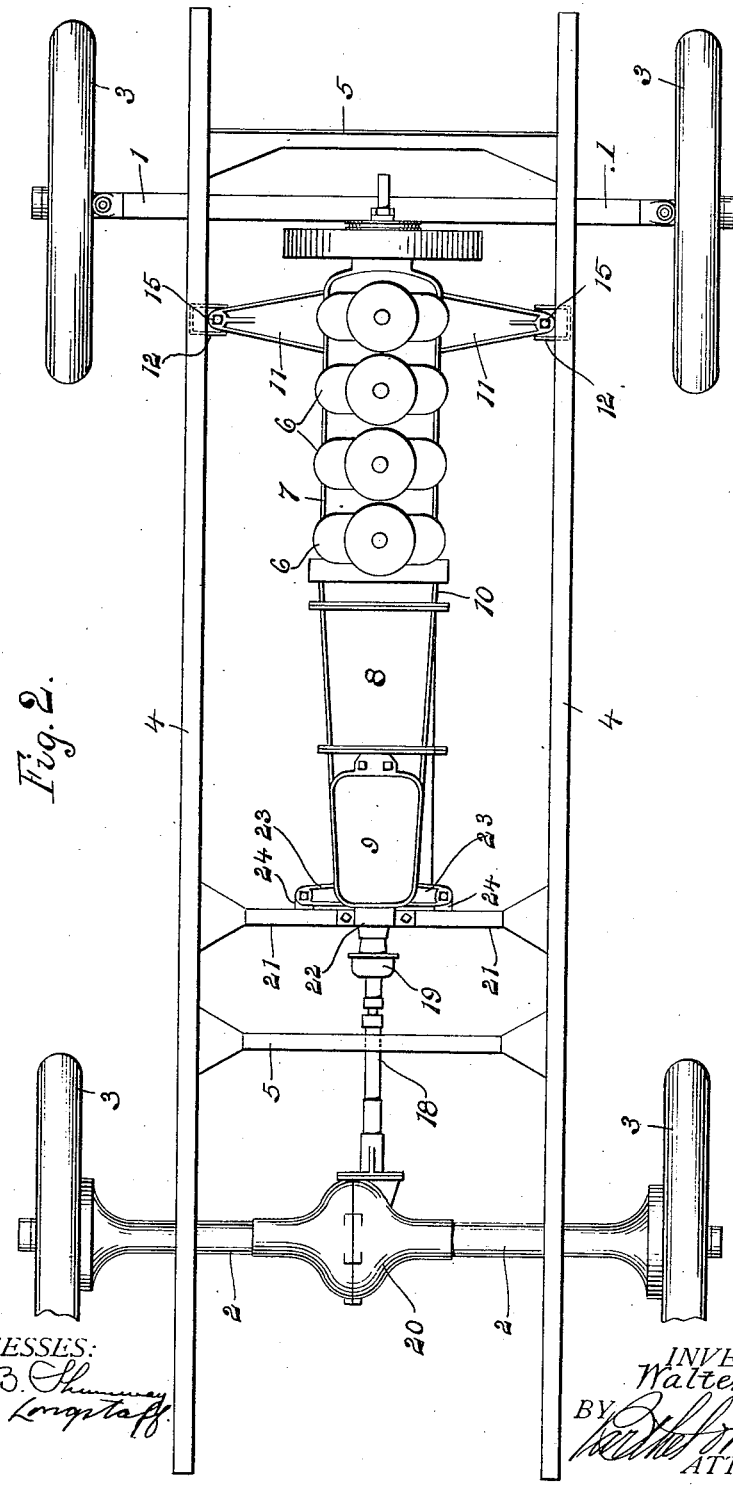

No. 886,528. PATENTED MAY 5, 1908.
W. L. MARR.
MOTOR VEHICLE.
APPLICATION FILED JULY 9, 1906.
3 SHEETS—SHEET 3.
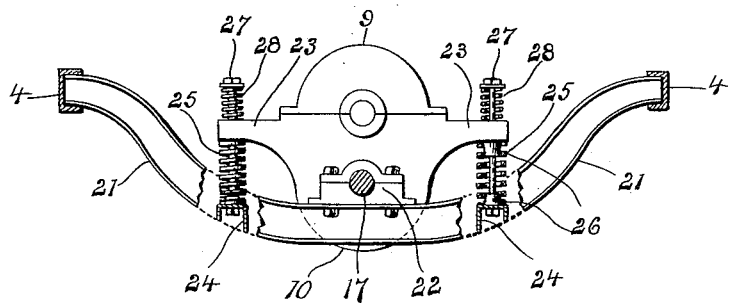
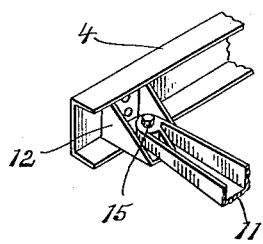
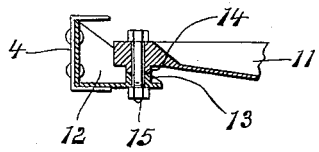
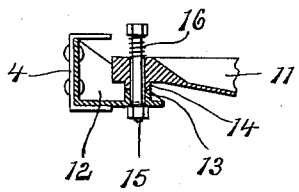
WITNESSES:
Chas. D. Shumway
Thos. A. Longstaff
INVENTOR.
Walter L. Marr
BY
ATTORNEYS

UNITED STATES PATENT OFFICE.

WALTER L. MARR, OF JACKSON, MICHIGAN.

MOTOR-VEHICLE.

No. 886,528.  Specification of Letters Patent.  Patented May 5, 1908.

Application filed July 9, 1906. Serial No. 325,220.

*To all whom it may concern:*

Be it known that I, WALTER L. MARR, a citizen of the United States of America, residing at Jackson, in the county of Jackson and State of Michigan, have invented certain new and useful Improvements in Motor-Vehicles, of which the following is a specification, reference being had therein to the accompanying drawings.

This invention relates to the construction of motor vehicles and more especially to that class of such vehicles in which the motor is located at the forward end of the machine with its crank shaft extending longitudinally of the frame and direct connected through suitable clutch and variable-speed transmission mechanism to the rear or driving axle by means of bevel gears and a driving shaft connected to the shaft of the transmission by a universal joint which provides the necessary flexibility in the line of connection. In such constructions, the engine and the clutch and variable-speed-transmission mechanisms must necessarily be carried by and secured to a suitable supporting frame or bed to hold them rigidly in alinement, and it is also highly desirable that said bed or frame be so supported upon the vehicle frame as to permit the latter to move freely in adapting itself to the varying surface of the road without subjecting the bed to undue strains. The universal connection between the driving and transmission shafts permits a free vertical movement of the bed, but, as ordinarily supported, when a front wheel drops into a hole in the road or is lifted by running over an obstruction and the frame thereby subjected to a severe torsional strain, the bed is also severely twisted, or, if supported in such a manner as to permit a limited movement to relieve such strain, the transmission shaft is moved laterally of the frame and driving shaft, thereby putting a severe strain on the universal joint and causing great wear and friction, owing to the fact that the driving shaft is rigidly held against lateral movement.

The main object of this invention is to so support the bed or other means for carrying in rigid alinement the motor, clutch and variable-speed-transmission device, as to permit a movement of said bed relative to the frame to relieve the bed from torsional strain and at the same time prevent any lateral movement of the transmission shaft, relative to the drive shaft.

It is also an object of the invention to provide certain other new and useful features in the construction, arrangement and combination of parts.

To this end the invention consists in supporting the carrying frame or bed for the engine and clutch and variable-speed-transmission device, upon three points of support, one at each side at its forward end, upon the vehicle frame and providing a single bearing support for its rear end in which it is free to turn and the axis of which bearing is concentric with the longitudinal axis of the transmission shaft.

The invention further consists in providing means for yieldingly sustaining the weight of the rear end of said bed, and in the particular construction, arrangement and combination of parts, all as hereinafter fully described and particularly pointed out in the claims, reference being had to the accompanying drawings, in which Figure 1, is a side elevation of a construction embodying the invention with parts broken away; Fig. 2, a plan view of the same; Fig. 3, a transverse section on the line *x*—*x* of Fig. 1; Fig. 4, is a detail of one of the forward supports for the bed; Fig. 5, a vertical section of the same; and Fig. 6, a similar view showing a modified construction.

As shown in the drawings 1 represents the front and 2 the rear axles of an automobile chassis supported by wheels 3 and upon which axles the side channel bars 4 connected by the cross bars 5 to form the supporting frame, are supported upon springs, all constructed and arranged in the usual manner.

6 represents the vertical cylinders of a multiple cylinder engine, the crank-shaft of which extends longitudinally of the frame and is inclosed within a tight base or casing 7 which is divided horizontally into upper and lower halves, and 8 is a cylindrical casing also divided horizontally into halves and bolted to the rear end of the crank case, forming a continuation thereof and serving as an inclosing casing for the clutch mechanism which connects the crank shaft of the engine with the driving-shaft of the variable-speed-transmission. Said clutch and transmission mechanism which are not shown in the drawings, may be of any of the ordinary forms, and the transmission is inclosed within a tight casing 9 bolted to the end of the clutch casing so that said casings together with the crank casing form a continuous rigid supporting frame or bed 10 for the engine, clutch and transmission to hold the same rigidly in alinement. This supporting bed is supported at its forward end upon the vehicle frame by providing the upper half of the crank casing with laterally extending integral arms 11, one extending from each side at its forward end to engage suitable brackets 12 formed of pressed steel and riveted within the channels of the side bars of the frame. To secure these arms to the brackets and at the same time permit a free rocking motion of one upon the other, a seat is provided on each bracket consisting of a cup-shaped projection or washer 13 to receive a projection or washer 14 on the arm having rounded lower face to fit the cup-shaped end of the seat, and a bolt 15 passes loosely through openings in the bracket, washers and arm to hold the arm in place. As shown in Fig. 6, a spring 16 may be interposed between the head of the bolt and the upper side of the arm to permit of a greater movement of the arm without binding.

The driven shaft 17 of the variable speed transmission projects through the rear end of the casing 9 and is attached to the forward end of a driving shaft 18 by a universal joint 19, the rear end of said driving shaft being connected to the rear or driving axle 2 by means of bevel gears and a gear casing 20, all as ordinarily constructed and arranged.

The rear end of the supporting bed 10 is supported upon the vehicle frame by providing a downwardly curved cross-bar 21 which is secured at its ends within the channels of the side bars of the frame, and upon this cross-bar at its middle is secured a suitable bearing 22 for the projecting end of the transmission shaft 17. The bed is thus supported at its rear end to turn freely around a horizontal axis upon torsional movement of the frame and this axis coincides with the longitudinal axis of the shaft 17 to which the universal joint is attached and is rigidly held against movement laterally of the frame. The bed is thus so supported at its rear end that it may turn in its bearing when one of the front wheels of the vehicle is raised or lowered and the torsional strain on the bed is thus relieved, and by locating this turning point concentric with the axis of the shaft, said shaft will not be thrown out of line or moved laterally of the frame by such torsional movement. The manner of supporting the forward end of the bed also permits a free relative movement without binding and thus the bed which forms a support to hold the motor, clutch and transmission in rigid alinement is flexibly supported on the frame and at the same time rigidly holds the transmission shaft in its proper relation to the driving shaft, preventing friction wear and strain.

To take the weight of the rear end of the bed from the shaft 17 and yieldingly support said end so that it may turn upon said shaft but will not bear heavily thereon, arms 23 are formed integral with the casing 9 and extend laterally from the sides thereof a short distance and on the cross-bar 21 are secured brackets 24 extending from the side thereof with coiled springs 25 interposed between said brackets and the ends of said arms. The springs 25 are held in place by bosses 26 extending upward therein from the brackets and downward therein from the under sides of the arms, and if found desirable they may be further held by bolts 27 extending through the brackets, bosses and arms in the axes of the springs. To assist in steadying the bed against a vibratory rocking motion, coiled springs 28 may be interposed between the heads of the bolts 27 and the upper sides of the arms.

The weight of the bed is thus taken from the transmission shaft to permit the same to turn freely and prevent wear, and at the same time the bed is free to rock with said shaft as the center of motion.

Having thus fully described the invention, what I claim is:—

1. The combination with the frame of a motor-vehicle, of a motor supporting bed supported at one end upon the sides of said frame, means for pivotally supporting the opposite end of said bed to turn upon a horizontal axis extending longitudinally of the bed and yielding means at each side of said bed to resist its turning.

2. The combination with the frame of a motor-vehicle, of a motor supporting bed supported at one end upon the sides of said frame, a power transmission shaft mounted in bearings on said bed, a bearing on the frame for said shaft, and means supported by the frame to yieldingly support the opposite end of the bed and take the weight thereof from the shaft.

3. The combination with the frame of a motor-vehicle, of a supporting bed consisting of a crank-casing extended longitudinally in one direction to form a casing for a clutch and for a variable-speed-transmission mechanism, a power transmission shaft of the variable-speed-transmission extending through the rear end of the bed, a bearing on the frame for the projecting end of said shaft to support the rear end of the bed, arms extending laterally from the forward end of said bed, and seats on the frame for said arms.

4. The combination with the frame of a motor-vehicle, of a motor supporting bed, arms extending laterally from the forward end of said bed, brackets on the sides of the frame, cup-shaped washers on the brackets to receive washers having rounded lower surfaces to engage the cups, bolts extending through the brackets, washers and arms, springs interposed between the heads on the bolts and the upper sides of the arms, and means for rotatively supporting the rear end of the bed.

5. The combination with the frame of a motor-vehicle, of a bed, a motor secured to said bed with its crank-shaft extending longitudinally of the bed, a variable-speed-transmission mechanism on the bed having a shaft extending through a bearing in the end of the bed, arms extending laterally from the bed at the forward end thereof to form two points of support for said end, one upon each side of the frame, a cross-bar on the frame, a bearing on the cross-bar to rotatively support the rear end of the bed and through which the transmission shaft extends, laterally extending arms on the rear end of said bed, and yielding means interposed between said arms and the cross-bar.

6. The combination with the frame of a motor-vehicle, of a motor supporting bed supported at its forward end upon the sides of the frame, a cross-bar on the frame, a bearing on said bar to rotatively support the rear end of the bed, a transmission shaft on the bed extending through said bearing, arms on the bed extending laterally therefrom, and coiled springs interposed between the ends of said arms and the cross bar.

7. The combination with the frame of a motor vehicle, of a motor supporting bed supported at its forward end upon the sides of the frame, a cross-bar on the frame at the rear end of the bed, a bearing on the bar, a power transmitting shaft on the bed engaging said bearing, brackets on the cross-bar having studs, arms extending laterally from the bed and provided with downwardly extending studs, and coiled springs sleeved on the studs between the brackets and arms.

8. The combination with the frame of a motor-vehicle, of a motor supporting bed supported at its forward end upon the sides of the frame, a cross-bar on the frame at the rear end of the bed, a power transmitting shaft on the bed extending beyond the same, a bearing for said shaft on the cross-bar, brackets on the cross-bar, arms on the bed, coiled springs interposed between the brackets and arms, bolts extending through the brackets, springs and arms, and coiled springs interposed between the heads of the bolts and the upper sides of the arms.

In testimony whereof I affix my signature in presence of two witnesses.

WALTER L. MARR.

Witnesses:
 WM. C. DURANT,
 A. H. GOSS.